United States Patent
Wallner

(10) Patent No.: US 10,088,573 B2
(45) Date of Patent: Oct. 2, 2018

(54) NAVIGATION SYSTEM USING SPREADING CODES BASED ON PSEUDO-RANDOM NOISE SEQUENCES

(75) Inventor: Stefan Wallner, AZ Noordwijk (NL)

(73) Assignee: EUROPEAN SPACE AGENCY, Paris (FR)

( * ) Notice: Subject to any disclaimer, the term of this patent is extended or adjusted under 35 U.S.C. 154(b) by 741 days.

(21) Appl. No.: 14/238,813

(22) PCT Filed: Aug. 16, 2011

(86) PCT No.: PCT/EP2011/004526
§ 371 (c)(1),
(2), (4) Date: Apr. 3, 2014

(87) PCT Pub. No.: WO2013/023669
PCT Pub. Date: Feb. 21, 2013

(65) Prior Publication Data
US 2014/0354473 A1    Dec. 4, 2014

(51) Int. Cl.
*G01S 5/14*     (2006.01)
*H04B 7/185*    (2006.01)
(Continued)

(52) U.S. Cl.
CPC .............. *G01S 19/13* (2013.01); *G01S 19/01* (2013.01); *H04B 1/709* (2013.01)

(58) Field of Classification Search
CPC .......... G01S 19/13; G01S 19/01; G01S 19/30; G01S 19/05; H04B 1/709; H04B 1/7075; G01C 21/26
(Continued)

(56) References Cited

U.S. PATENT DOCUMENTS 5,390,207 A * 2/1995 Fenton ................. G01S 19/215
                                                          342/357.61
5,414,729 A * 5/1995 Fenton ................... G01S 19/22
                                                          342/357.61
(Continued)

FOREIGN PATENT DOCUMENTS

EP       2287634 A1    2/2011
WO    2011039042 A1    4/2011

OTHER PUBLICATIONS

Wallner et al. ("Revised PRN Code Structures for Galileo E1 OS"; Sep. 10, 2008).*
(Continued)

*Primary Examiner* — Bernarr E Gregory
*Assistant Examiner* — Nuzhat Pervin
(74) *Attorney, Agent, or Firm* — Park, Vaughan, Fleming & Dowler LLP

(57) ABSTRACT

One embodiment of the invention provides a receiver for use in a navigation system comprising multiple transmitters. Each transmitter transmits a positioning signal comprising a pseudo-random noise (PRN) sequence corresponding to the respective transmitter. The receiver comprises a code module for supplying multiple PRN sequences corresponding to the respective multiple transmitters; and a correlator for correlating the PRN sequences supplied by the code module with an incoming signal. The multiple PRN sequences are based on a single Sidelnikov/Lempel/Cohn/Eastman (SLCE) generative sequence $u^{SLCE}$, and each of said multiple PRN sequences, denoted $u^i$ satisfies the equation: $u^i = u^{SLCE} \oplus T^i u^{SLCE}$, where $\oplus$ indicates element by element binary XOR addition, and $T^i$ indicates a cyclic shift of i chips.

14 Claims, 8 Drawing Sheets
(7 of 8 Drawing Sheet(s) Filed in Color)

(51) Int. Cl.
  *G01S 19/13* (2010.01)
  *G01S 19/01* (2010.01)
  *H04B 1/709* (2011.01)

(58) Field of Classification Search
  USPC .................. 342/357.395; 375/140, 147, 150
  See application file for complete search history.

(56) References Cited

U.S. PATENT DOCUMENTS

| | | | | |
|---|---|---|---|---|
| 5,666,366 | A * | 9/1997 | Malek | H04B 7/269 370/503 |
| 5,953,367 | A * | 9/1999 | Zhodzicshsky | G01S 19/22 375/147 |
| 5,960,028 | A * | 9/1999 | Okamoto | H04B 1/707 375/130 |
| 6,400,753 | B1 * | 6/2002 | Kohli | G01C 21/26 375/130 |
| 6,724,811 | B2 * | 4/2004 | Kohli | G01C 21/26 375/130 |
| 8,090,005 | B2 * | 1/2012 | Barnes | G01S 19/02 375/130 |
| 9,071,342 | B1 * | 6/2015 | Jin | H04B 1/709 |
| 2003/0227963 | A1 * | 12/2003 | Dafesh | G01S 19/246 375/149 |
| 2004/0213334 | A1 * | 10/2004 | Ledvina | G01S 19/30 375/150 |
| 2006/0050625 | A1 * | 3/2006 | Krasner | G01S 1/04 370/208 |
| 2008/0129591 | A1 * | 6/2008 | Lamance | G01S 19/05 342/357.42 |
| 2008/0151971 | A1 * | 6/2008 | Mo | H04B 1/7085 375/150 |
| 2008/0238765 | A1 * | 10/2008 | Zhang | G01S 19/05 342/357.62 |
| 2009/0168851 | A1 * | 7/2009 | Wang | H04B 1/7075 375/150 |
| 2010/0328145 | A1 * | 12/2010 | Wang | G01S 19/24 342/357.24 |
| 2011/0280285 | A1 * | 11/2011 | Kim | H04J 13/0003 375/146 |
| 2014/0241402 | A1 * | 8/2014 | Mattos | H04B 1/7103 375/150 |
| 2015/0381308 | A1 * | 12/2015 | Falk | H04K 1/02 380/268 |

OTHER PUBLICATIONS

Kim et al. ("New Families of M-Ary Sequences With Low Correlation Constructed From Sidel'nikov Sequences", Aug. 1, 2008).*
Wallner et al. ("Revised PRN Code Structures for Galileo E1 OS", XP-002671661, ION GNSS 21st. International Technical Meeting of the Satellite Division, Sep. 16-19, 2008, Savannah, GA).*
Y. S. Kim et al. ("New Families of M-Ary Sequence With Low Correlation Constructed From Sidel'nikov Sequences", IEEE Transactions on Information Theory, vol. 54, No. 8, Aug. 2008).*
Wallner et al. ("Revised PRN Code Structures for Galileo EI OS", XP-002671661, ION GNSS 21st. International Technical Meeting of the Satellite Division, Sep. 16-19, 2008, Savannah, GA) (Year: 2008).*
Y. S. Kim et al. ("New Families of M-Ary Sequence With Low Correlation Constructed From Sidel'nikov Sequences", IEEE Transactions on Information Theory, vol. 54, No. 8, Aug. 2008 (Year: 2008).*
Stefan Wallner, et al. "Revised PRN Code Structures for GALIELO E1 OS", ION GNSS 21st. International Technical Meeting of the Satellite Division, Sep. 10, 2008, pp. 887-899.
Young-Sik Kim, et al. "New Families of -Ary Sequences With Low Correlation COnstruction From Sidel'nikov Sequences", IEEE Transactions on Information Theory, IEEE Press, USA, vol. 54, No. 8, Aug. 1, 2008, pp. 3768-3774, XP011231439.
Nam Yul Yu, et al. "New Construction of M-Ary Sequence Families with Low Correlation From the Structure of Sidelnikov Sequences", IEEE Transactions on Information Theory, IEEE Press, USA, vol. 56, No. 8, Aug. 1, 2010, pp. 4061-4070.
Abraham Lempel: A class of Balanced Sequence with optimal Autocorrelation Properties, IEEE Transaction on Information Theory, vol. 23 No. 1 Jan. 1977.
Joseph J. Rushanan: Weil Sequences: A Family of Binary Sequences with Good Correlation Properties ISIT 2006, Seattle, USA, Jul. 9, 2006.

* cited by examiner

NAVIGATION SYSTEM USING SPREADING CODES BASED ON PSEUDO-RANDOM NOISE SEQUENCES

FIELD OF THE INVENTION

The present invention relates to navigation systems that use pseudo-random noise (PRN) sequences as spreading codes, such as a satellite navigation system and/or a ground-based pseudolite system.

BACKGROUND OF THE INVENTION

Satellite-based navigation systems (also referred to as for use in a radio navigation satellite systems) are becoming increasingly important in a wide range of applications, including handheld devices for position determination, in-car navigation support, and so on. The main satellite navigation system in service at present is the global positioning system (GPS) operated by the United States Department of Defense. A European counterpart satellite navigation system, named Galileo, is planned for launch and service availability later this decade. Numerous other satellite navigation systems like GLONASS (Russia), Compass (China), IRNSS (India) and QZSS (Japan) are currently under modernization or under deployment.

A satellite navigation system comprises a constellation of satellites, each of which broadcasts one or more signals. The satellite emitted signals are received at earth at very low power levels, so that it is difficult to receive them in a deep indoor environment. Investigations are ongoing to make use of pseudolites to extend the service coverage of navigation signals also to deep indoor environments. In order to allow the reception of these pseudolite signals by satellite navigation receivers, the signal structure of the pseudolites may be very similar or identical to the navigation signal emitted by satellites.

The basic components of a navigation signal as emitted by a satellite or a pseudolite are a spreading code (also referred to as a positioning, synchronisation or ranging code) which is combined with the spreading symbol setting the modulation waveform and the navigation data. The resulting combination is then modulated onto a carrier at a set frequency for transmission to earth. Each emitter generally transmits at multiple frequencies, which can help to compensate for ionospheric effects, to improve accuracy and to broadcast more data.

In some cases, multiple signal channels may be modulated onto a single carrier via some appropriate multiplexing scheme. For example, it is planned for Galileo signals to comprise a data channel combined with a pilot channel. The pilot channel contains only a spreading code, but no navigation data, while the data channel contains both the spreading code and the navigation data.

The spreading code component of a satellite signal typically comprises a predetermined sequence of bits (referred to as 'chips') and is used to perform two main tasks. Firstly, the spreading code provides a synchronisation and access mechanism to allow a receiver to lock onto a satellite signal. Thus each satellite (and typically each signal broadcast from that satellite) has its own spreading code. When a receiver is first switched on, the receiver frequently does not know which satellite signals can be received, since certain satellites in the constellation will be below the horizon for that particular location at that particular time. The receiver uses the spreading codes to lock onto a signal from a first satellite. Accordingly, a spreading code allows a receiver to distinguish and separate between simultaneously transmitting devices in a situation where all of the transmitting devices are applying the same modulation scheme (but with different spreading codes applied) and transmit at the same carrier frequency. Once a receiver has locked onto the signal from a first satellite, the navigation data in the signal can be accessed. This then provides almanac data for the other satellites in the constellation, and allows the remaining satellites that are visible to the receiver to be acquired relatively quickly.

Many receivers employ a two-phase acquisition process. In the first phase, the receiver performs a simultaneous correlation of the incoming signal against the set of satellite spreading codes. In particular, the receiver searches for a spreading code from any satellite, allowing for any possible timing offset between the satellite and the receiver, and for any possible Doppler shift between the satellite and the receiver (which is dependent on the motion of the satellite in space relative to the user). If a correlation value is found to exceed a predetermined threshold, then a second phase involving a more detailed analysis is performed for the relevant combination of satellite spreading code, timing offset and Doppler shift. This second-phase analysis verifies and confirms or if necessary rejects the initial coarse acquisition. In some cases, a receiver may store or access, e.g. over the Internet, the almanac data about those satellites that are currently visible to the receiver (rather than first having to acquire one satellite signal in order to obtain this information). This is sometimes referred to as assisted-GNSS, and can significantly reduce the time taken to obtain a position determination.

The second main task of a spreading code is to provide a distance estimate from the satellite to the receiver, based on the time that it has taken the signal to travel from the satellite to the receiver. The position of the receiver is then determined in three-dimensional space by using a process of trilateration, given the known positions of the satellites (as specified in the navigation data received from the satellites). In theory, trilateration can be performed with signal information from a minimum of three satellites, assuming that the timing offset between the receiver clock and satellite clocks is known. In practice, this timing offset is generally unknown, except for specialised receivers, so that signal information is obtained from at least one additional satellite to compensate for the unknown time offset at the receiver. If signals from further satellites are available, a statistical position determination can be performed using any appropriate algorithm such as least squares. This can also provide some indication of the error associated with an estimated position.

One important parameter for a spreading code is the chip rate at which the spreading code is transmitted, since this in turn controls the accuracy with which the positional determination can be made. Another important parameter for a spreading code is its total length, in other words the number of chips in the spreading code before it repeats. Spreading codes of infinite length are not practical for a number of reasons, including problems at generation and also at acquisition level. However the finite length of a spreading code can lead to ambiguity in the position determination. A longer length for the spreading code reduces such ambiguity, and also provides better separation of signals from different sources and increases robustness against interference. On the other hand, having a longer repetition length for the spreading code may delay initial acquisition of the signal, as well as requiring more processing capability within the receiver.

The length of the spreading code also impacts the data rate that can be used for the navigation data, since traditionally the navigation data is modulated onto the spreading code sequence applying Binary Phase Shift Keying (BPSK) modulation, i.e. only one bit of navigation data is modulated onto one complete spreading code sequence. In such circumstances, the length of the spreading code reflects the spreading code's chip rate and the data rate for the navigation data (or other data being transmitted on the channel). Alternatively more efficient data modulation schemes like Cyclic Code Shift Keying (CCSK) are currently under investigation for satellite navigation systems. Generally, the longer the repetition length for the spreading code, the lower the bit rate for the navigation data will be.

One known strategy to construct long codes based on shorter length codes is to use a hierarchical or tiered spreading code based on primary and secondary codes. If we assume that a primary code has N1 chips and a secondary code has N2 chips, then the first N1 chips of the overall spreading code correspond to the primary sequence exclusive-ORed with the first chip of the secondary code, the next N1 chips of the spreading code comprise a repeat of the N1 chips of the primary code, this time exclusive-ORed with the second chip of the secondary code, and so on. This gives a total repetition length for the code of N1×N2, however the initial acquisition can be based on the primary code only. The tiered code approach is commonly used for the definition of the spreading codes for a pilot channel signal where no data is to be transmitted.

The use of spreading codes in satellite navigation systems is closely related to code division multiple access (CDMA) communications, which are widely used in terrestrial settings. However, there are some differences between these two contexts. For example, in CDMA, the spreading code is not used for making a position determination, and the selection of spreading codes is therefore not impacted by factors relating to position determination. Conversely, in CDMA, there are normally multiple receivers per transmitter, and each receiver uses a different spreading code for communicating with the transmitter. Accordingly, an important factor for CDMA is supporting a large number of codes that can operate in parallel. In contrast, this factor is less important for satellite navigation, since the total number of codes to be used in a given code set is usually based on the number of satellite transmitters and the number of channels (data/pilot). In a typical case, a number of approximately 70 PRN codes can serve one GNSS constellation, assuming that data and pilot channels are to be provided by the specific signal. Allowance must also be made for an extension of the GNSS by local elements (e.g. pseudolites). For example, for each pseudolite, at least one specific PRN code is required to provide the data channel. If a pilot channel is to be provided for the pseudolite as well, two PRN codes are to be transmitted by the local element. In most cases, this represents only a very small subset of the total overall code space (which is given by $2^{N-1}$, where N is the number of bits or chips in a code).

Known spreading codes, as used in both satellite navigation and CDMA systems, are based on pseudo-random noise (PRN) sequences. In order to alleviate the separation of the various channels transmitted by the various transmitters of a satellite navigation system, which show up at the receivers with identical modulation waveforms, it is very important for the cross-channel interference to be as low as possible.

A standard measure of cross-channel interference is given by the cross-correlation function, which provides a measure of the similarity between different PRN sequences. Accordingly, an important figure of merit to evaluate a set of PRN sequences for use as spreading codes is given by the cross-correlation function between pairs of spreading codes. The cross-correlation function $\theta_{u,v}(l)$ for two PRN sequences u and v, both having a length N, at a time offset of l chips between the two code sequences, is defined by:

$$\theta_{u,v}(l) = \sum_{n=0}^{N-1} u_n v_{n+l}. \quad (1)$$

where the n-th PRN chip of the sequence u is referred to as $u_n$ and the n+l-th chip of the sequence v is denoted as $v_{n+l}$. Each PRN code is periodic (cyclic) in N, so that the N values for sequence v starting at offset l are as follows:

$$(v_l, v_{l+1}, \ldots, v_{N-1}, v_0, v_1, \ldots, v_{l-1}) \quad (2)$$

The position determination in satellite navigation systems is derived from an estimate of the time of arrival (TOA) of the signals, which is determined using the auto-correlation function, $\theta_u(l)$, which for a sequence u at a phase shift of l chips is defined by:

$$\theta_u(l) = \sum_{n=0}^{N-1} u_n u_{n+l}. \quad (3)$$

The auto-correlation function in effect measures the similarity (or difference) between any PRN sequence and a time shifted version of the same sequence.

In an ideal system, the cross-correlation values between each pair of spreading codes is zero (for all possible offsets). Likewise, the auto-correlation value for each spreading code is zero for all offsets (time shifts) apart from no time delay, i.e. a phase shift of l=0, for which it is clear that $\theta_u(l)=N$. However, such ideal behaviour can only be achieved for PRN codes of infinite length. Since infinite PRN codes are not applicable to real-world systems, finite PRN codes have to be identified that resemble this ideal behaviour as closely as possible. A further important practical criterion for a spreading code is to have equal (or nearly equal) numbers of ones and zeros—this is referred to as balancing.

One complication is that the polarity of a spreading code may change at the end of the spreading code—this is how the navigation data can be encoded. This is illustrated schematically below (compare with the sequence of (2) above):

$$(v_l, v_{l+1}, \ldots, v_{N-1}, -v_0, -v_1, \ldots, -v_{l-1}) \quad (4)$$

An auto- or cross-correlation function determined in the context of a change in polarity is referred to as an odd auto- or cross-correlation function. An auto- or cross-correlation function determined in the absence of any change in polarity is referred to as an even auto- or cross-correlation function (and matches the formal definition of equation (3) above).

There are two broad classes of known PRN sequences. In a first class, the PRN sequences are generated according to a mathematical algorithm (algebraic formula) in closed form, such that there is some predetermined mathematical relationship between all the spreading codes in the code set. The correlation properties of such a code set follow from the algebraic formula used to generate the code set. Well known PRN sequences that belong to this first class include Gold codes,
Kasami codes,
Weil codes,
Bent codes
Gong codes,
Paterson codes.

These codes can be shown to offer almost ideal auto- and cross-correlation properties. However, such codes face the restriction that they can be just constructed for specific (preset) code lengths. For example, Gold codes as well as Kasami codes, which are usually implemented by linear feedback shift registers (LFSR), can be set up for any length specified by $N=2^n-1$, for integer values n that satisfy $\mod(n, 4) \neq 0$. In contrast, Weil codes can be constructed for any prime code length. Accordingly, the number of potential code lengths using Weil code sequences significantly exceeds the number of potential code lengths to choose from when using Gold codes or Kasami codes. For example, for 0<N<50000, there exist 5133 prime numbers, whereas the LFSR-based sequences can be set up only for 15 different sequence lengths.

The GPS satellite navigation system utilizes for its L1 C/A signal spreading codes that are Gold codes, implemented using linear feedback shift registers (LFSRs), in which selected outputs from an N-stage shift register are tapped and fed back to the input. The feedback connections within the LFSR can be represented as a binary polynomial in modulo-2 arithmetic of order n, so that the operation of an LFSR is fully specified by its polynomial and the initial setting of the LFSR. The repetition length of the code is $2^n-1$, so that a relatively compact LFSR can generate an output with a long repetition length.

In general, the code length is determined by the ratio of the chip rate of the spreading code and the bit rate of the navigation data. If the code length is restricted to an available Gold code (or some other algorithmic form of code), then this implies a constraint on the chip rate and the bit rate, which might in turn impact other considerations, such as acquisition time and positioning accuracy. In consequence, working with LFSR-based PRN codes, it is often not possible to align as desired all three defining elements, i.e. LFSR-based PRN code length, symbol rate and chip rate of the signal, and so the PRN code length often has to be adapted correspondingly. One known option to address such an issue is either to truncate a code or to extend it by adding a number of chips to the output code coming from the LFSR. However, any deviation from the preset code length for such a code generally results in a significant degradation of code performance, especially in terms of increased cross-correlation and out-of-phase autocorrelation. This is illustrated by the example of FIG. 1, which compares the cross-correlation performance of 1023-bit Gold codes (the GPS C/A codes) with a version of this code having just a single bit truncated. In particular, the X-axis of FIG. 1 represents cross-correlation performance, while the Y-axis represents the proportion of total correlations (out of all the different pairings and offsets for the code set) that have the corresponding cross-correlation performance It can be seen that for the GPS C/A codes (green), there is a high peak close to zero (nominally ideal performance) and two subsidiary peaks either side. However, for the truncated GPS C/A codes (blue), the central peak has been significantly reduced, to produce a broader spread of cross-correlation values. Note that the maximum cross-correlation values are larger (i.e. further from the central peak) than the subsidiary peaks from the actual (non-truncated) GPS C/A codes. This can lead to increased interference between channels, and hence degrade signal acquisition.

The second class of known PRN sequences are not based on closed algebraic formulae, but rather are generated using numerical methods. For example, random codes can be constructed for any desired code length, and they can be optimized for any figure of merit (FOM), based generally on cross-correlation and auto-correlation properties, as described, for example, in US 2008/0246655. Another approach in the second class is to use chaotic algorithms to set up PRN sequences that show properties as close to random sequences as possible.

PRN sequences of this second class typically require a higher complexity for the transmitter and receiver, since every single bit of the sequence needs to be stored in memory and then read out in real time (hence this class of sequence is sometimes referred to as a memory code). For example, the set of memory codes for a receiver might be stored within some form of ROM such as flash memory. These codes can then be loaded into the receiver chipset at boot time for use during detection of the spreading codes in the incoming satellite signals. If the complete memory codes are loaded into the receiver chipset itself, this may represent a very significant overhead in terms of storage locations on the receiver chipset. Alternatively, the codes might be loaded into a RAM (external to the receiver chipset), where they would represent only a comparatively small addition to the overall program and/or data storage requirements for general receiver operations. However, in this case a dedicated high-speed interface to feed the codes in real-time from the RAM onto the receiver chipset is likely to be required, as well as some additional internal buffering within the receiver chipset itself.

Furthermore, although a high level of auto- and cross-correlation performance can be achieved for the second category of PRN sequences, PRN sequences that are generated based on known analytical formulae usually significantly outperform random codes of identical length in terms of their auto- and cross-correlation properties.

SUMMARY OF THE INVENTION

One embodiment of the invention provides a receiver for use with a navigation system comprising multiple transmitters, where each transmitter transmits a positioning signal comprising a pseudo-random noise (PRN) sequence corresponding to the respective transmitter. The receiver comprises: a code module for supplying multiple PRN sequences corresponding to the respective multiple transmitters; and a correlator for correlating the PRN sequences supplied by the code module with an incoming signal. The multiple PRN sequences are based on a single Sidelnikov/Lempel/Cohn/Eastman (SLCE) generative sequence $u^{SLCE}$, each of said multiple PRN sequences, denoted $u^i$, satisfying the equation: $u^i = u^{SLCE} \oplus T^i u^{SLCE}$, where $\oplus$ indicates element by element binary XOR addition, and $T^i$ indicates a cyclic shift of i chips. The receiver may be provided as a standalone device, or may be incorporated into some other electronic equipment, such as a mobile (cellular) telephone, a camera, a vehicle navigation system, and so on. The transmitters are generally located on respective satellites in a constellation of satellites (such as provided for GPS or Galileo), but might also be provided by ground-based (local) elements, such as pseudolites. The receivers themselves may be incorporated into satellites, to allow inter-satellite links to be used for ranging.

It has been found that PRN sequences such as described above have very good properties for use as spreading codes. The multiple PRN sequences have an even length, equal to a prime number minus 1, which means that there is a relatively high density of code families available—equal to the density of prime numbers (compared with the much lower density of LFSR based codes, e.g. Gold codes).

The multiple PRN sequences all have a balance of −2, zero, or four (a balance of zero is generally considered to be ideal). In some cases, depending on the proportion of codes within a code family that are to be utilised, one option is to select just PRN sequences that have a balance of zero.

The generator sequence, $u^{SLCE}$, is derived from a primitive root element of a prime number p. Depending on the primitive root element which is selected, and the maximum correlation magnitude for said multiple PRN sequences is given by $4+2\lceil\sqrt{N}\rceil$ or by $12+2\lceil\sqrt{N}\rceil$, where N=p−1. This correlation performance is competitive in comparison with existing (known) code sequences, and helps to ensure good signal acquisition (low cross channel interference).

There are N/2 PRN sequences available from the generator sequence, $u^{SLCE}$, where N is the length of the PRN sequences. Accordingly, the code family for each generator sequence, $u^{SLCE}$, is rather large. In certain applications, it is therefore possible to select a set of PRN sequences representing a subset of the overall code family. The PRN sequences could be selected, for example, based on having a balance of zero, and/or based on providing good correlation properties for odd correlation (the maximum correlation magnitude mentioned above of $4+2\lceil\sqrt{N}\rceil$ or $12+2\lceil\sqrt{N}\rceil$ relate to even correlation).

In one embodiment, the code module includes digital logic circuitry for generating said multiple PRN sequences on the fly from $u^{SLCE}$. Accordingly, there is no need for a receiver to store each code of the full code family in any sort of memory. The generator sequence itself, $u^{SLCE}$ may be stored in a read only memory (ROM), or the code module may include digital logic circuitry for generating $u^{SLCE}$ on the fly according to the mathematical properties of a Sidelnikov/Lempel/Cohn/Eastman sequence.

Another embodiment of the invention provides a method of operating a receiver for use in a navigation system comprising multiple transmitters, each transmitter transmitting a positioning signal comprising a pseudo-random noise (PRN) sequence corresponding to the respective transmitter. The method comprises: receiving an incoming signal at the receiver; and correlating the incoming signal against multiple PRN sequences. The multiple PRN sequences are based on a single Sidelnikov/Lempel/Cohn/Eastman (SLCE) generative sequence $u^{SLCE}$, each of said multiple PRN sequences, denoted $u^i$, satisfying the equation: $u^i = u^{SLCE} \oplus T^i u^{SLCE}$, where $\oplus$ indicates element by element binary XOR addition, and $T^i$ indicates a cyclic shift of i chips.

Another embodiment of the invention provides apparatus for use in a navigation system comprising multiple transmitters, each transmitter transmitting a positioning signal comprising a pseudo-random noise (PRN) sequence corresponding to the respective transmitter. The apparatus comprises: a code module for supplying a PRN sequence; and a transmitter module for transmitting the PRN sequence. The PRN sequence is generated according to: $u^i = u^{SLCE} \oplus T^i u^{SLCE}$, where $u^{SLCE}$ is a single Sidelnikov/Lempel/Cohn/Eastman (SLCE) generative sequence, $\oplus$ indicates element by element binary XOR addition, and $T^i$ indicates a cyclic shift of i chips, and different transmitters have a different respective PRN sequence by selecting a different value of i. Such an apparatus may comprise, for example, a satellite forming part of a satellite navigation system, or some local element, such as a pseudolite or other ground transmitter system.

Another embodiment of the invention provides a method of operating apparatus for use in a navigation system comprising multiple transmitters, each transmitter transmitting a positioning signal comprising a pseudo-random noise (PRN) sequence corresponding to the respective transmitter. The method comprises: supplying a PRN sequence to a transmitter module in the apparatus; and transmitting the PRN sequence from the transmitter module. The PRN sequence is generated according to: $u^i = u^{SLCE} \oplus T^i u^{SLCE}$, where $u_{SLCE}$ is a single Sidelnikov/Lempel/Cohn/Eastman (SLCE) generative sequence, $\oplus$ indicates element by element binary XOR addition, and $T^i$ indicates a cyclic shift of i chips, and different satellites have a different respective PRN sequence by selecting a different value of i.

Another embodiment of the invention provides a method of generating a set of pseudo-random noise (PRN) sequences for use in a navigation system comprising multiple transmitters, each transmitter transmitting a positioning signal corresponding to the respective transmitter, and each positioning signal comprising one of the set of pseudo-random noise (PRN) sequences. The method comprises providing a Sidelnikov/Lempel/Cohn/Eastman (SLCE) generative sequence, $u^{SLCE}$; and generating each PRN sequence in said set of PRN sequences according to: $u^i = u^{SLCE} \oplus T^i u^{SLCE}$, where $\oplus$ indicates element by element binary XOR addition, and $T^i$ indicates a cyclic shift of i chips.

The above approach allows a large number of code families to be generated, since a Sidelnikov/Lempel/Cohn/Eastman generative sequence can be defined for each primitive root element of a prime number minus one. Furthermore, each code families contains a large number of codes (N/2, where N is the length of the code in chips). Accordingly, there is flexibility in selecting a particular code family, or particular codes within a family, according to the specific requirements of any intended application. For example, the set of PRN sequences may be selected such that each PRN sequence has a balance of zero, or an optimisation procedure may be performed in which PRN sequences are selected so that the set of PRN sequences provides good correlation properties for odd correlation.

Another embodiment of the invention provides a communication system in which multiple transmissions are performed in parallel. Each of said multiple transmissions is encoded using a spreading code comprising a different one of a set of pseudo-random noise (PRN) sequences. Each PRN sequence in said set of PRN sequences is specified by: $u^i = u^{SLCE} \oplus T^i u^{SLCE}$, where $u^{SLCE}$ denotes a Sidelnikov/Lempel/Cohn/Eastman (SLCE) generative sequence, $\oplus$ indicates element by element binary XOR addition, and $T^i$ indicates a cyclic shift of i chips. Such a communication system can be used, for example, to support CDMA communications, where set of the PRN sequences provide the spreading codes for multiplexing transmissions together.

Another embodiment of the invention provides a set of spreading codes for use in a communication system in which multiple transmissions are performed in parallel, each of said multiple transmissions being encoded using a spreading code comprising a different one of a set of pseudo-random noise (PRN) sequences. Each PRN sequence in said set of PRN sequences is specified by: $u^i = u^{SLCE} \oplus T^i u^{SLCE}$, where $u_{SLCE}$ denotes a Sidelnikov/Lempel/Cohn/Eastman (SLCE)

generative sequence, ⊕ indicates element by element binary XOR addition, and T$^i$ indicates a cyclic shift of i chips.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention will now be described in detail by way of example only with reference to the following drawings.

DETAILED DESCRIPTION

A new code family as described herein can be constructed for any code length N that follows:

$$N=p-1 \quad (5)$$

where p refers to any prime number. Any sequence contained in the new code family therefore has an even length, in contrast to most publicly known code families in the first class, as constructed from a closed algebraic formula, which usually have an odd length (or are derived from odd length sequences), as is the case for Gold codes, Kasami codes, Weil-codes, and so on. The new code family is derived from one single sequence, in contrast to e.g. Gold codes and Kasami codes, in which two appropriate sequences are usually selected as the basis for deriving the full code family.

The generation of the required single sequence has been published by Sidelnikov and Lempel/Cohn/Eastman independently, and are therefore referred to herein as SLCE sequences (see V M Sidelnikov, Some k-valued pseudo-random sequences and nearly equidistant codes, Probl. Inf. Trans., 1969, (5), 1, pp 12-16, and A. Lempel et al., A class of balanced binary sequences with optimal autocorrelation properties, *IEEE Transactions on Information Theory*, 23: 38-42, 1977). SLCE sequences are based on primitive root elements—a definition of primitive roots is given in A. Leutbecher, Zahlentheorie—Eine Einführung in die Algebra, Springer Verlag, Berlin Heidelberg New York, 1996. The identification of a primitive root element is the first step for generating SLCE sequences. For the next step, we form a set S defined as:

$$S=\{pr^{2i+1}-1\}_{i=0}^{k-1} \quad (6)$$

with
pr . . . primitive root modulo p$^m$−1
p . . . prime number
k=½(p$^m$−1) . . . which is actually half the desired code length.

The final SLCE sequence $u_n^{SLCE}$ is defined for a delay n according to the following formula:

$$u_n^{SLCE} = \begin{cases} +1 & \text{if } pr^n \in S \\ -1 & \text{else} \end{cases}, 0 \leq n < 2k. \quad (7)$$

As shown in A. Lempel et al., A class of balanced binary sequences with optimal autocorrelation properties, *IEEE Transactions on Information Theory*, 23: 38-42, 1977, the maximum autocorrelation side peaks for SLCE sequences are very good, as they can be limited by:

$$\theta_u = \begin{cases} 0 \text{ or } -2 & \text{if } k \text{ is odd} \\ 0 \text{ or } 4 & \text{if } k \text{ is even} \end{cases}. \quad (8)$$

Figure 1:
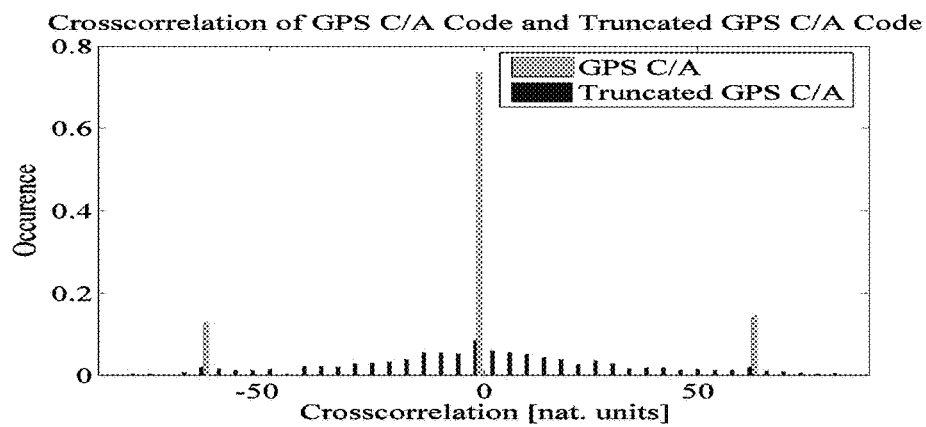
FIG. 1 is a diagram illustrating the effects of truncation on a GPS C/A spreading code.
Figure 2:
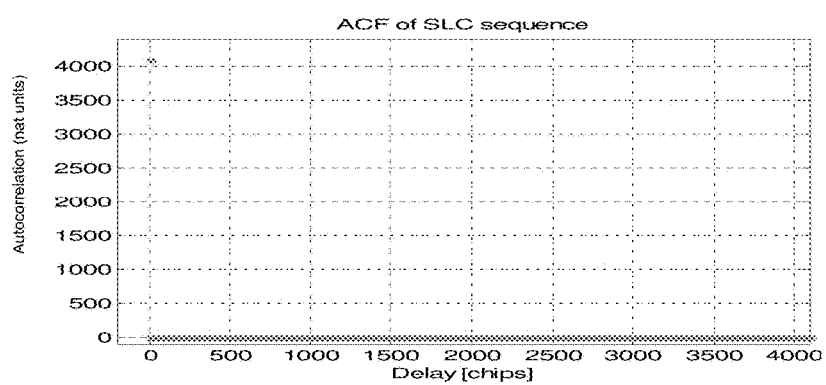
FIG. 2 is a diagram illustrating the auto-correlation performance of SLCE codes.

The even autocorrelation function of one SLCE sequence of length N=4092 is shown in FIG. 2 and we can verify equation (8), as the autocorrelation side lobes in this Figure adopt just values of either 0 or 4. However, SLCE sequences generally show bad cross-correlation performance among themselves, i.e. the cross-correlation of one SLCE sequence with another SLCE sequence does not approximate to (or at least approach) zero for all phase offsets between the two SLCE sequences.

The new code family of even length as described herein can be constructed based on the following generation scheme. The i-th PRN sequence of this family is given by:

$$u^i = u^{SLCE} \oplus T^i u^{SLCE} \quad (9)$$

where
$u^{SLCE}$ relates to the generative SLCE sequence,
⊕ to the element by element binary XOR addition
T$^i$ indicates a cyclic shift of i chips.
Based on this generation algorithm a set of N/2 sequences can be constructed that form the new code family. In other words, all the sequences in the new code family are formed from just one single SLCE sequence of length N. (Different initial SLCE sequences can then be used to generate different code families).

Properties and Performance of New Code Family

The balance property BAL for the n-th PRN sequence is defined by the addition of the individual chips:

$$BAL^n = \sum_{i=1}^{N} u_i^n \quad (10)$$

The balance of a PRN sequence corresponds to one of the Golomb postulates for randomness, and can be considered as figure of merit to characterize the randomness of any PRN sequence (balance can also be a useful property for practical reasons, for example, to avoid any DC component in a PRN signal). The balance value for a PRN should generally be as close to zero as possible. For the new code family described herein, the balance value for each individual sequence is 0, −2 or 4, independent of the PRN code length N. This immediately follows from the autocorrelation property of the generative SLCE sequence, as the balance for the n-th PRN sequence calculates to:

$$BAL^n = \sum_{i=1}^{N} u_i^n = \sum_{i=1}^{N} u_i^{SLCE} \oplus T^n u_i^{SLCE} = \theta_{u^{SLCE}}(n) \quad (11)$$

In consequence it turns out that:

$$BAL^n = \begin{cases} 0 \text{ or } -2 & \text{if } k \text{ is odd} \\ 0 \text{ or } 4 & \text{if } k \text{ is even} \end{cases} \quad (12)$$

which is very close to matching the ideal balance criterion of zero. Moreover, the ideal balance criterion of zero is fulfilled exactly for a subset of sequences belonging to the generated new code family.

As mentioned above, auto- and cross-correlation properties represent the metric of generally the most significance for PRN sequences (as applied to satellite navigation systems). The so-called Welch Lower Bound (or Welch Bound) for short is usually considered to be the widely accepted bound when assessing the best correlation performance that a family of PRN codes can achieve. The Welch Bound indicates the minimum of the maximum out-of-phase auto- and cross-correlation magnitudes that can be achieved. Indeed, it is impossible for a code set to achieve maximum correlation magnitudes lower than the Welch Bound for any set of PRN sequences.

A mathematical introduction and definition of the Welch Bound is given in L. R. Welch. Lower bounds on the maximum cross correlation of signals. *IEEE Transactions on Information Theory*, 20:397-399, 1974. The Welch bound for any set of K sequences, each of length N, calculates to:

$$\theta_{Welch} = N\sqrt{\frac{K-1}{KN-1}} \quad (13)$$

The Welch bound simplifies to:

$$\theta_{Welch} = \sqrt{N}. \quad (14)$$

as the code length N tends to infinity.

The Gold codes approach the Welch bound in the limit, since the maximum auto- and cross-correlation sidelobes for a set of Gold codes of order k calculate to:

$$\max|\theta^{Gold}| = 1 + 2^{\lfloor(k+2)/2\rfloor} \quad (15)$$

In consequence two categories of Gold codes can be identified, depending on k being odd or even, since these result in different maximum correlation magnitudes:

$$\max|\theta^{Gold}| = \begin{cases} 2\lfloor\sqrt{2^k-1}\rfloor + 1 = 2\lfloor\sqrt{N}\rfloor + 1 & \text{for } \mod(k,4) = 2 \\ \lceil\sqrt{2(2^k-1)}\rceil + 1 = \lceil\sqrt{2N}\rceil + 1 & \text{for } \mod(k,2) = 1 \end{cases} \quad (16)$$

where $N = 2^k - 1$ represents the code length.

This Gold code limit will now be used to demonstrate the strength of the new code families in terms of correlation performance (noting that Gold codes are not available for k being a multiple of 4—i.e. $\mod(k, 4) = 0$). Thus with reference to the new code family as defined above in equation (9), for any prime number p, a number of $\varphi(\varphi(p))$ primitive root elements exist, where $\varphi(\cdot)$ represents the Euler's totient function. Any of these primitive root elements can be used to derive a new code family. Depending on the selected primitive root element, two different categories of resulting PRN code families can be identified, which can be distinguished by the resulting maximum correlation magnitude:

$$\max|\theta^{NewCodeFamily}| = \qquad (17)$$
$$\begin{cases} 2\lceil\sqrt{p-1}\rceil + 4 = 2\lceil\sqrt{N}\rceil + 4 & \text{for } pr \in \text{Category 1} \\ 2\lceil\sqrt{p-1}\rceil + 12 = 2\lceil\sqrt{N}\rceil + 12 & \text{for } pr \in \text{Category 2} \end{cases}$$

Figure 3:
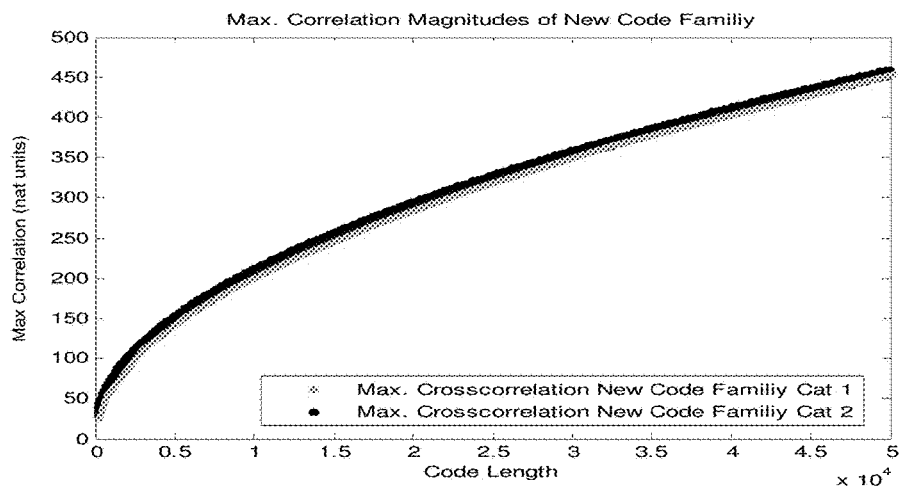
FIG. 3 is a diagram illustrating the variation of maximum correlation against code length for the new code family in accordance with one embodiment of the invention.

It should be appreciated that for any code length conforming to the prime−1 length requirement, both category 1 and category 2 code families can be constructed. The maximum correlation for both categories is shown in FIG. 3. The maximum correlation for both categories follows the same general curve, with the maximum correlation for category 1 codes (shown in black) a little higher than the maximum correlation for category 2 codes.

Table 1 characterizes a large number of known PRN code families regarding their code length, the size of the resulting family, and the maximum correlation magnitude, based on information given by J. Rushanan, The Spreading and Overlay Codes for the L1C Signal, Journal of Navigation, Vol. 54, No. 1, pp 43-51, 2007. The last two rows of Table 1 relate to the new PRN code family defined by equation (9) above. A comparison with the existing PRN code families shows that:

- Only code families #7, 10 and 11 allow for an even code length (apart from new code families #13 and 14, but code families #7, 10 and 11 all have much more stringent restrictions on overall code length than the new code families #13, 14.
- The maximum correlation magnitude of the New Code Family follows generally the same trend (order($2\sqrt{N}$)) as code families #2, 4, 7, 9 and 11.
- The individual cells of Table I are configured such that the presence of stars in a cell indicates the relative merit of the relevant property. In particular, there are four levels of relative merit: (1) three stars in a cell indicates an outperforming property; (2) two stars in a cell indicates a good or excellent property; (3) one star in a cell indicates a moderate or fair property; and (4) no stars in a cell indicates significant shortcomings—these are especially apparent in relation to code length and family size.

| # | Name | Code Length N | Family Size | Maximum Correlation |
|---|------|---------------|-------------|---------------------|
| 1 | Gold (odd) | $2^n - 1$, mod(n,2) = 1 | N + 2 *** | $1 + \sqrt{2(N+1)}$ ** |
| 2 | Gold (even) | $2^n - 1$, mod(n,4) = 2 | N + 2 *** | $1 + 2\sqrt{N+1}$ ** |
| 3 | Kasami (small) | $2^n - 1$, mod(n,2) = 0 | $\sqrt{N+1}$ | $1 + \sqrt{N+1}$ |
| 4 | Kasami (large) | $2^n - 1$, mod(n,4) = 2 | $(N + 2)\sqrt{N+1}$ *** | $1 + 2\sqrt{N+1}$ ** |
| 5 | Bent | $2^n - 1$, mod(n,4) = 0 | $\sqrt{N+1}$ | $1 + \sqrt{N+1}$ *** |
| 6 | No | $2^n - 1$, mod(n,2) = 0 | $\sqrt{N+1}$ | $1 + \sqrt{N+1}$ *** |
| 7 | Gong | $2(2^n - 1)$ | $\sqrt{N}$ | $3 + 2\sqrt{N+1}$ ** |
| 8 | Paterson, Gong | $p^2$, mod(p,4) = 3 | $\sqrt{N} + 1$ | $3 + 2\sqrt{N+1}$ * |
| 9 | Paterson | $p^2$, mod(p,4) = 3 | N *** | $5 + 4\sqrt{N+1}$ * |
| 10 | Z4 linear, Family I | $2(2^n - 1)$, mod(n,2) = 1 | N/2 + 1 *** | $2 + \sqrt{N+2}$ *** |
| 11 | Z4 linear, Family II | $2(2^n - 1)$, mod(n,2) = 1 | $(N + 2)^2/4$ *** | $2 + 2\sqrt{N+2}$ ** |
| 12 | Weil | p *** | (N − 1)/2 *** | $5 + 2\sqrt{N}$ ** |
| 13 | New Code Family, Category 1 | p − 1 *** | N/2*** | $4 + 2\sqrt{N}$ ** |
| 14 | New Code Family, Category 2 | p − 1 * | N/2* | $12 + 2\sqrt{N}$ ** | p: prime number; n,k∈ IN

Table 1. Comparison of Different PRN Code Families

Figure 4:
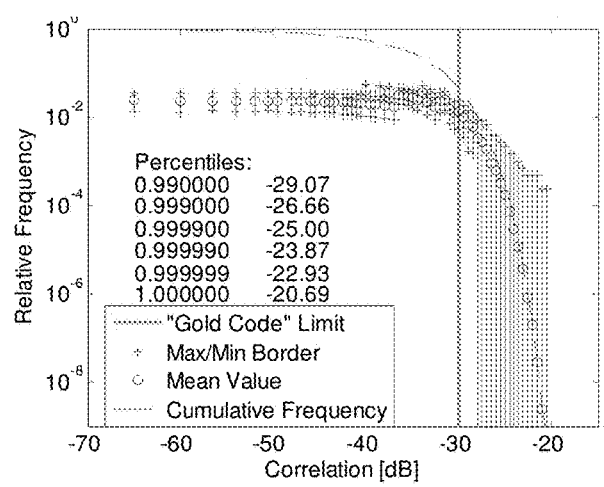
FIG. 4 is a diagram illustrating the correlation performance of the new code family in accordance with one embodiment of the present invention.

We will now consider the auto- and cross-correlation performance of various PRN code families. FIG. 4 is a histogram illustrating such performance. In particular, FIG. 4 indicates all correlation magnitudes that result from an entire code family consisting of K sequences, each of length N. This leads to a number, $(K^2/2-K/2)N$, of cross-correlation values, which are all shown in FIG. 4. The blue crosses in FIG. 4 indicate the maximum and minimum relative frequency with which the corresponding correlation magnitude shows up in one specific correlation function based on the selection of a pair of two PRN sequences out of the full code family. If a minimum is not indicated in FIG. 4, there exists at least one code pair combination that does not produce the corresponding correlation magnitude for any correlation function. The black circles indicate the mean value with which the corresponding correlation magnitude is found. Here the average is taken over all $K^2/2-K/2$ potential code pair combinations. The dashed red line indicates the cumulative frequency of the various mean values, while the green vertical line relates to the correlation limit for Gold codes of the appropriate length according to equation (15) above.

FIG. 4 also specifies various percentiles and the corresponding correlation values (in dB). The $100^{th}$ percentile is for a correlation function of −20.69 dB—i.e. this was the maximum value found for all the correlations.

Figure 5A:
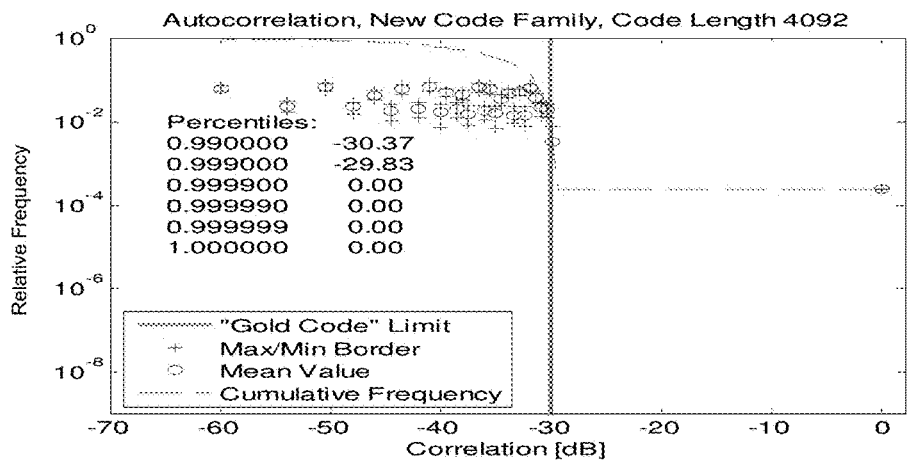
FIGS. 5A and 5B are diagrams illustrating the auto- and cross-correlation performance respectively for a code having length 4092 from the new code family in accordance with one embodiment of the invention.
Figure 5B:
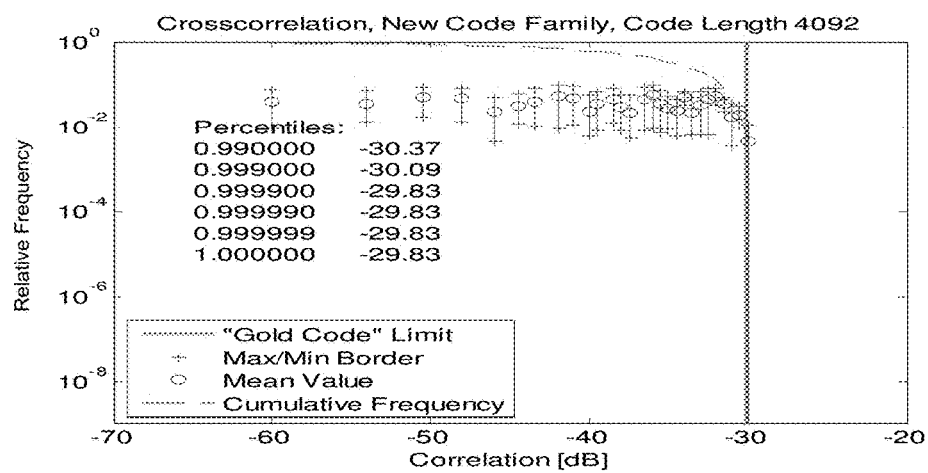
Figure 5C:
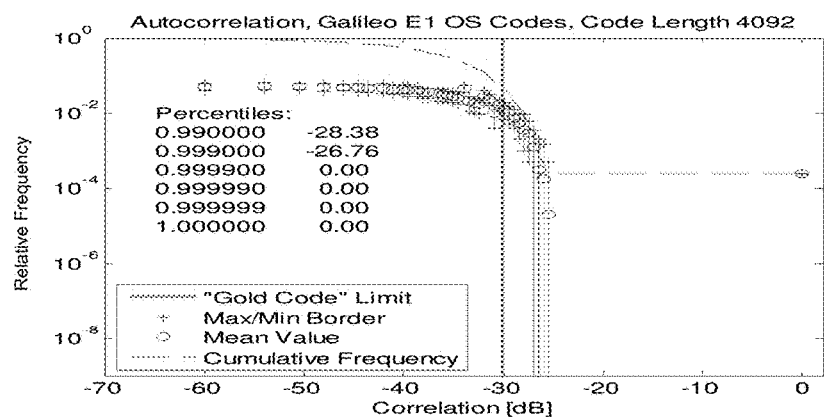
FIGS. 5C and 5D are diagrams illustrating the auto- and cross-correlation performance respectively for the Galileo E1 OS PRN sequences having length 4092.
Figure 5D:
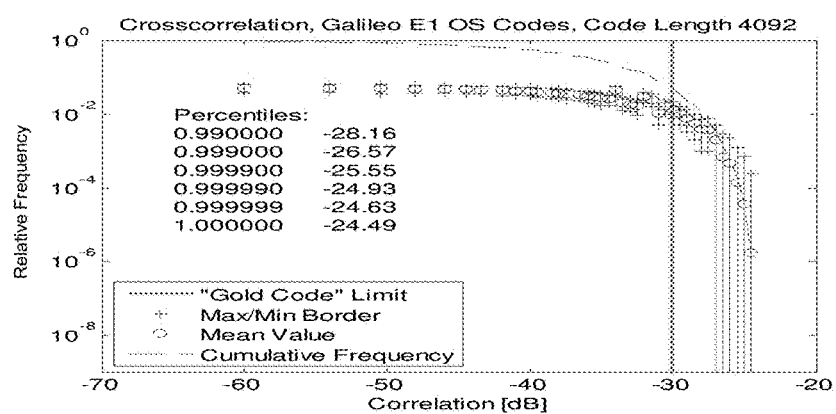

As already described above, the new code family can be constructed for any code length equal to a prime number−1. In this way a family of codes directly fitting to the Galileo E1 OS code length requirements can be constructed. In particular, the codes to be used by Galileo for E1 OS require a code length of 4092, since this results directly from a chip rate of 1.023 Mcps and a symbol rate of 250 sps. FIGS. 5A and 5B show the auto- and cross-correlation performance respectively of the new code family (category 1) for a length of 4092 chips. This performance can be compared to the performance of the Galileo E1 OS PRN sequences as shown in FIGS. 5C and 5D for the auto- and cross-correlation performance respectively (the Galileo E1 OS PRN sequences are listed in hexadecimal notation in Annex C of European GNSS (Galileo) Open Service Signal In Space Interface Control Document, Issue 1, February 2010). It can be seen that the even auto- and cross-correlation performance of the new code family, as shown in FIGS. 5A and 5B respectively, is generally better than the even auto- and cross-correlation performance of the Galileo E1 OS PRN sequences, as shown in FIGS. 5C and 5D respectively. For example, the performance of the new code family generally falls within the Gold code limit for maximum correlation, as shown in FIGS. 5A and 5B, whereas this is not the case for the E1 OS PRN sequences. Note that the results of FIGS. 4 and 5 are presented as particular examples of the new code family, and similar results can be obtained for other code lengths for which a new code family can be constructed.

Figure 6:
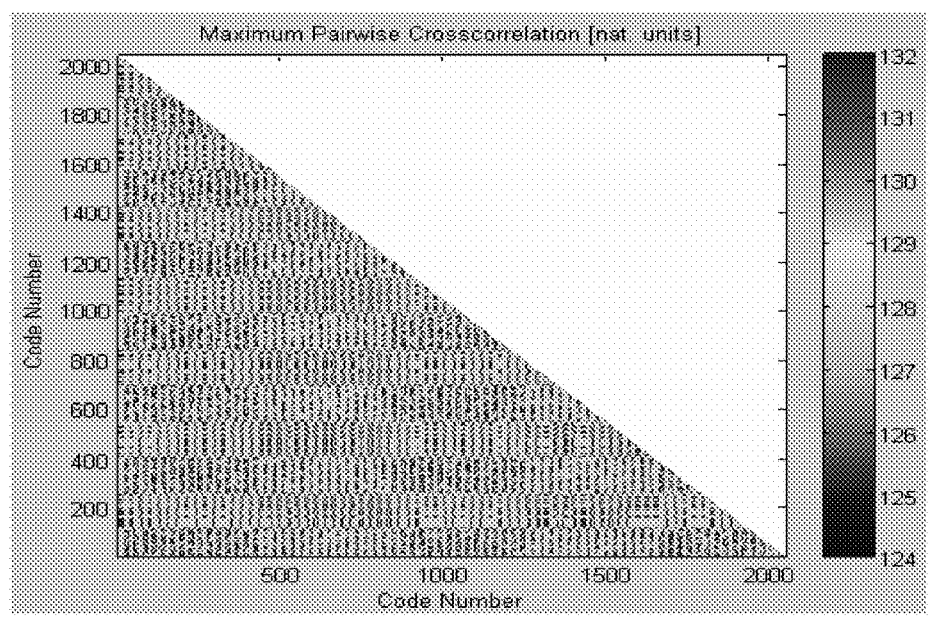
FIG. 6 is a diagram illustrating the maximum pairwise cross-correlation for each pair of codes having length 4092 from the new code family in accordance with one embodiment of the invention.

FIG. 6 relates to the same new code family of length 4092 as FIGS. 5A and 5B, and shows the maximum pairwise correlation evaluation for each of the possible code pairings. As mentioned above, the code size of the new code family is N/2=2046, which corresponds to $(N/2)^2/2-N/4$ different possible code pairings. For each such code pairing, there are N possible offsets (corresponding to the length of the code). Thus FIG. 6 is a heat mapping that illustrates the maximum pairwise correlation for a given pair of codes from the new code family. In particular, the location within the map corresponds to the pair of codes selected (one on the X-axis, one on the Y-axis), while the colour of the map at that location denotes the maximum correlation for that pair.

The results from FIG. 6 are summarized in Table 2. There are only three values for the maximum pairwise correlation function for all the different combinations of the 2046 codes, namely 124, 128 and 132. In other words, the variation of the maximum pairwise cross-correlation function is rather small across the whole code family (only between −30.37 dB and −29.83 dB), and just over three-quarters of the pairs have a maximum even cross-correlation coefficient of −30.10 dB. In contrast, the Galileo E1 OS PRN sequences have a maximum even cross-correlation function of −24.49 dB.

TABLE 2

Maximum Even Crosscorrelation Magnitudes and their Occurrence for New Code Family

| | Correlation magnitude [nat. units] | | |
|---|---|---|---|
| | 124 | 128 | 132 |
| | Correlation magnitude [dB] | | |
| | −30.37 | −30.10 | −29.83 |
| Relative occurrence | 0.04% | 75.03% | 24.93% |

It will also be appreciated that the new code family provides various other advantages over the the Galileo E1

OS PRN sequences. For example, only 137 Galileo E1 OS PRN sequences are provided, whereas the new code family provides 2046 PRN codes. This may be particularly significant if the satellite navigation system is supplemented by local elements (such as pseudolites), as described in more detail below.

Furthermore, all of the desired Galileo E1 OS PRN sequences are stored on a bit by bit basis in the receiver. In contrast, the new code family can be stored using just one stored SLCE sequence, with all of the remaining codes in the family then rapidly generated as and when required (on the fly) according to equation (9) above. Note that this equation (9) can be implemented very readily in digital logic circuitry, including the simultaneous generation of multiple (potentially all) different codes within a given code family in parallel. In addition, it is expected that the initial SLCE sequence from which the code family is generated could itself be generated on the fly using a digital logic circuit implementation of equations (6), (7) and (8) above. This may provide for a more compact implementation than storing the complete SLCE sequence in some form of memory (e.g. ROM).

Although the above discussion has been based on conventional (even) correlation properties, it has already been mentioned that odd correlation properties are also important for spreading codes. An odd correlation occurs when the bit of navigation data (or other information signal) that is being encoded with the spreading code flips, so that the polarity of the spreading code reverses at the end of the relevant cycle (so that the code is no longer truly cyclic). For the first class of algebraic PRN sequences (including the new code family described herein), odd correlation usually falls outside the readily predicted mathematical properties of the PRN sequence, and so generally has to be investigated numerically.

Figure 7:
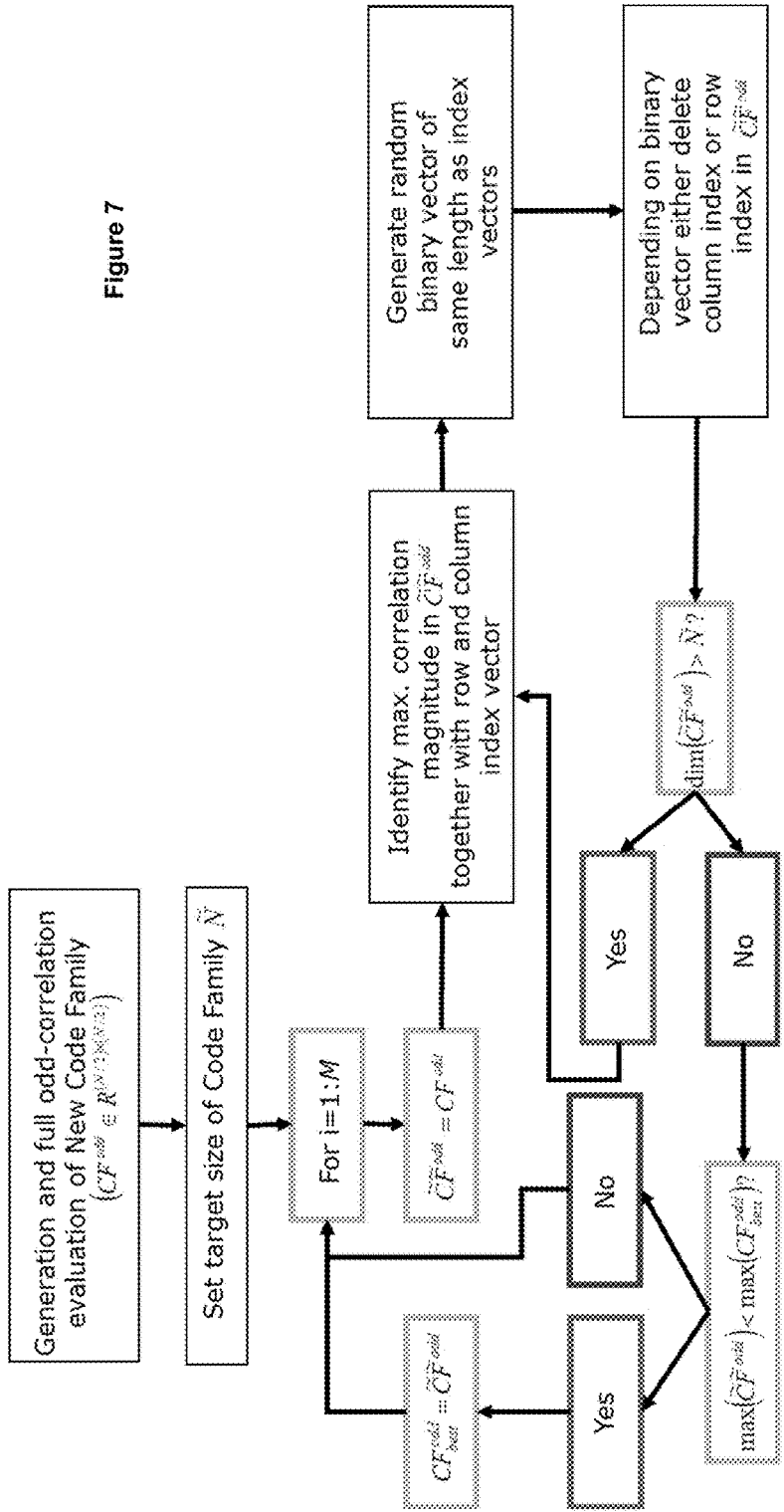
FIG. 7 is a schematic flow chart of a method for selecting a subset of code sequences having good odd correlation performance in accordance with one embodiment of the invention.

As mentioned above, the new code family comprises a large number (N/2) of members. This may represent far more codes that are needed in a satellite navigation system—compare e.g. the 2046 codes of 4092 chips discussed in relation to FIGS. 5A-5D, compared with the 137 Galileo E1 OS PRN sequences. FIG. 7 therefore presents a flowchart of a method in accordance with one embodiment of the invention for selecting a subset of a new code family for use in a particular application, where the selection is based on the odd correlation properties of the new code family.

The method opens with generating the full odd correlation properties of all the N/2 codes in the new code family and saving into a matrix CF, where each element of CF corresponds to a particular pair of codes (as determined by the position of the element in the matrix), and the value of the element represents the maximum (odd) correlation for that pair of codes. In addition, the target size ($\tilde{N}$) of the desired subset of the new code family is set. The procedure now performs up to M iterations, where each iteration represents a separate attempt to select a subset of the codes having good odd correlation.

In each iteration, we define a matrix $\tilde{CF}$ that is initially equal to CF, and then generate delete one or more rows/columns from $\tilde{CF}$. There are various ways in which this could be done, for example by deleting one code (i.e. row and corresponding column) at a time on a random basis; deleting one code at a time, wherein this code includes the highest current maximum correlation value in CF; deleting multiple codes (e.g. N/2−$\tilde{N}$) at a time on a random basis; deleting multiple codes at a time based on those codes that contain high (or highest) maximum correlation values. In each case, when a subset of the codes has been produced of the target size ($\tilde{N}$), it is determined whether or not the maximum correlation for this iteration is better (lower) than the maximum correlation obtained from any previous iteration. If so, this becomes the current best code subset (denoted CF(odd)$_{best}$ in FIG. 7), and after M iterations, this subset represents the best subset obtained in terms of odd correlation.

It will be appreciated that the processing of FIG. 7 is by way of example only, and the skilled person will be aware of many potential variations. For example, rather than deleting codes from the entire family, the optimisation might start with a set of $\tilde{N}$ codes (i.e. the target size of the family), and then replace one or more selected codes in this codes family to try to reduce the maximum correlation. The replacement may be performed at random, or might be based on removing those codes in the subset that have a relatively high maximum correlation.

Figure 8A:
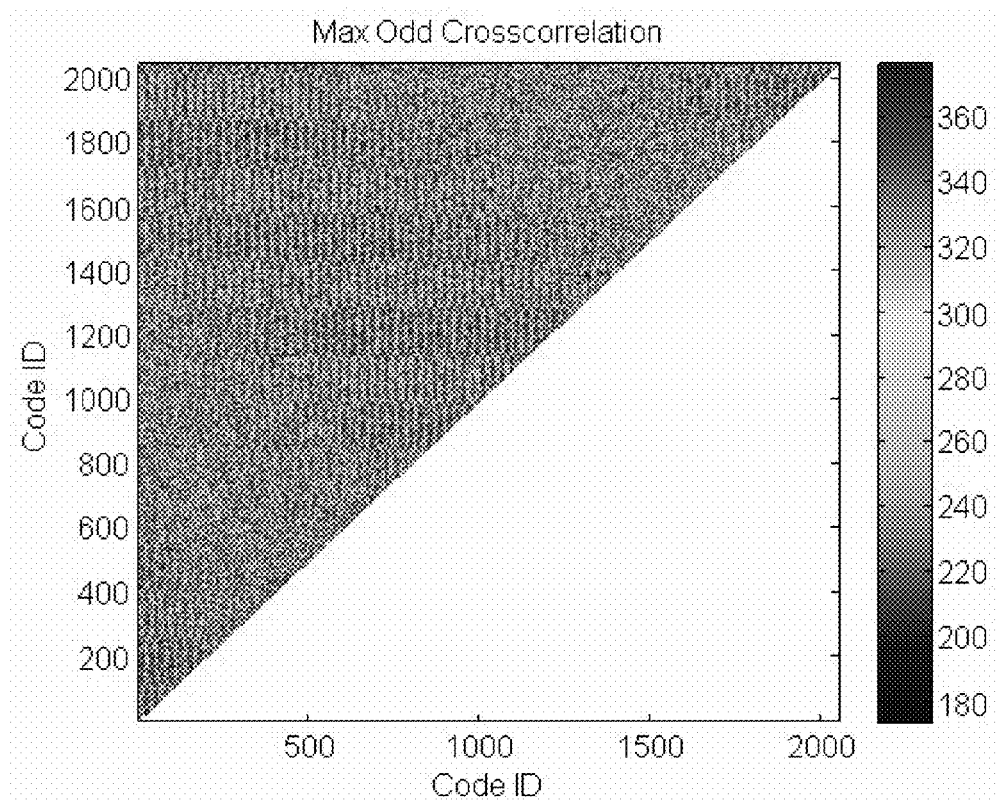
FIG. 8A is a diagram illustrating the maximum pairwise odd correlation for each pair of codes having length 4092 from the new code family in accordance with one embodiment of the invention.
Figure 8B:
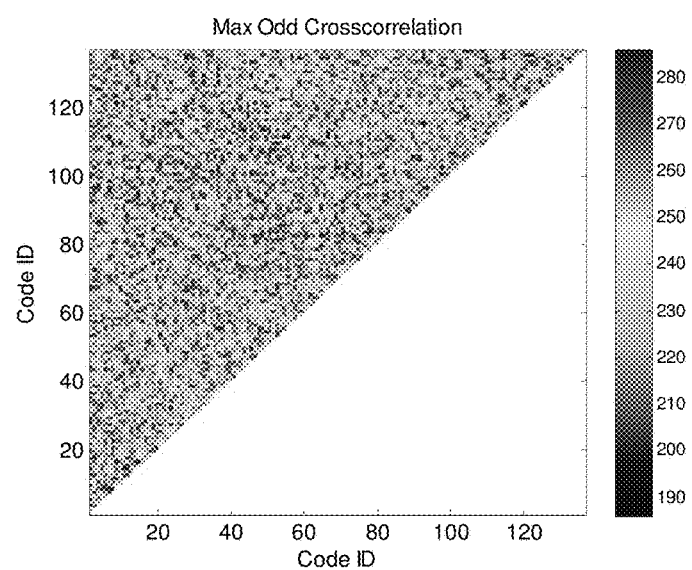
FIG. 8B is a diagram illustrating the maximum pairwise odd correlation for a subset of the codes of FIG. 8A that have been selected for good odd correlation performance in accordance with one embodiment of the invention.

FIG. 8A is a heat map analogous to FIG. 6 (for the same set of codes), but shows the maximum odd (rather than even) pairwise correlation. Note that the maximum odd correlation values shown in FIG. 8A are generally higher than the maximum even correlation values shown in FIG. 6 (as would be expected). FIG. 8B is a heat map representing the maximum odd pairwise correlation for a subset of 137 of the codes depicted in FIG. 8 (corresponding to the number of 137 Galileo E1 OS PRN sequences). This subset was determined according to the optimization procedure of FIG. 7. Note that the heat map scale in FIG. 8B is reduced compared with the heat map scale of FIG. 8A, and overall there is a reduction of 7 dB (in this particular example) of the maximum odd correlation in the code subset, compared with the maximum odd correlation in the full code set.

Figure 9:
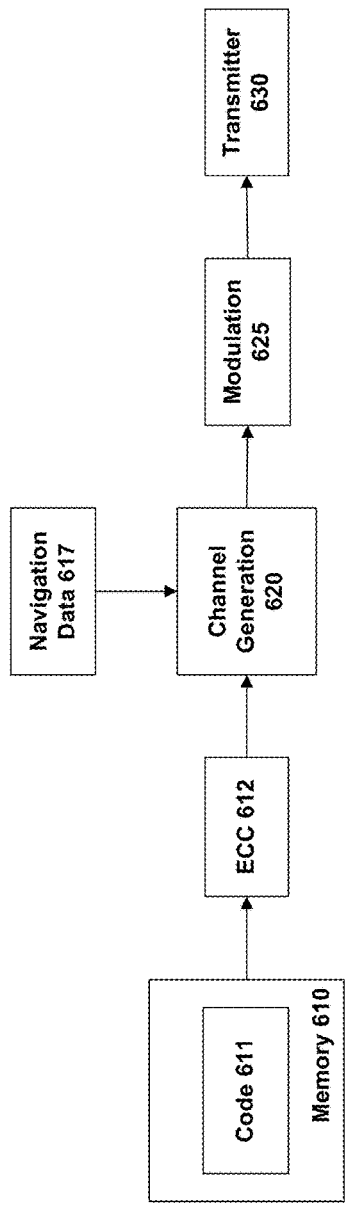
FIG. 9 is a schematic diagram of a satellite transmission system for transmitting a spreading code in accordance with one embodiment of the invention.

FIG. 9 is a high-level schematic block diagram of a transmission system 601 for use in a satellite payload in accordance with one embodiment of the invention. (It will be appreciated that an analogous structure could also be used in a pseudolite or other such device that emulates a satellite). The transmission system 601 utilises a spreading code 611 based on a PRN sequence as described herein. In the embodiment of FIG. 9, the spreading code 611 is stored in a read only memory (ROM) 610. In one implementation memory device 610 may be operated from a logical perspective as a circular buffer, using a read pointer to cycle around the stored code sequence 611.

The feature size of modern memory devices is very small. The stored bits in memory 610 may therefore be vulnerable to cosmic ray hits (especially in a space environment) and other possible contamination. Accordingly, in one embodiment, the output of memory device 610 is passed through an error correction code (ECC) unit 612 to protect the accuracy of code 611. The ECC unit 612 is able to detect an error in code 611 as read out from memory 610, and may be able, in some circumstances, to automatically correct the error (depending upon the nature of the code and the error). The skilled person will be aware of many ECC mechanisms from data communications and data storage applications, such as the use of convolutional encoding, cyclic redundancy codes (CRC), and so on. Memory 610 is long enough to store the full length of code 611. In other words, if code 611 has a length of 4092 chips (for example), then memory 610 has a capacity of at least 4092 bits to store the entire code on a bit for bit basis (plus additional storage for any redundancy or ECC facility).

After the code has passed through the ECC check 612, it is combined with the navigation data 617 by the channel generation subsystem 620. This combination is generally performed using some form of module-2 addition (exclusive-OR). The resulting channel is then passed to a modulation unit 625, where it is superimposed on a carrier signal using some appropriate modulation mechanism, such as binary phase shift keying (BPSK), binary offset carrier (BOC) modulation or any other modulation scheme. Note that in some satellite systems, multiple channels may be modulated onto a single carrier signal. The carrier signal is then passed to transmitter 630 for broadcast to earth.

Although in theory code 611 may be "hard-wired" into memory 610 prior to launch, it is considerably more flexible if memory device 610 includes a write capability—e.g. it is implemented as some form of programmable read only memory (PROM). For example, if ECC check 612 does discover that the stored code 611 has been corrupted at all, then a write capability for memory device 610 allows the correct version of the code to be written back into the memory device 610 (the correct version of the code may be available from the ECC unit 612 itself, or may have to be provided by the ground control systems). There can also be various other reasons for wanting to update the code 611 stored in memory 610. For example, a new code might be installed to help improve performance during a testing phase, perhaps if the original code suffers from interference with some other service or satellite. There might also be commercial or security reasons for changing code 611, the former to raise licensing revenue perhaps, the latter to restrict access to the positioning signal to suitably authorised personnel.

Although storing the spreading code into memory device 610 is generally less compact than the use of an LFSR (such as used for Gold code), it is noted that a satellite (unlike a receiver) only has to store a single spreading code 611. Furthermore, the cost of memory device 610 is generally extremely small compared with the overall cost of constructing, launching, and operating a satellite.

In some embodiments, rather than having memory device 610 provided as a ROM, the code may be stored into specially-configured digital logic, such as described in WO 2007/101454. This type of memory device does not have a regular structure of memory cells as in a conventional ROM, but rather is formed of a bespoke configuration of combinatorial logic particular to the stored code. This can lead to a more compact memory device 610 (although it is then difficult to update the spreading code 611 held within the memory device).

A further possibility is that the memory device 610 (and ECC unit 612) of FIG. 9 are replaced by circuitry that provides a digital logic representation of the algebraic generation of the code, analogous to the use of an LFSR for Gold codes. (In contrast, the memory device of WO 2007/101454 is a digital logic representation of a particular code sequence, and does have a direct relationship with the underlying mathematical formulae, if any, used to generate the code sequence). This circuitry then allows the code sequence to be (re)generated as and when required.

Figure 10:
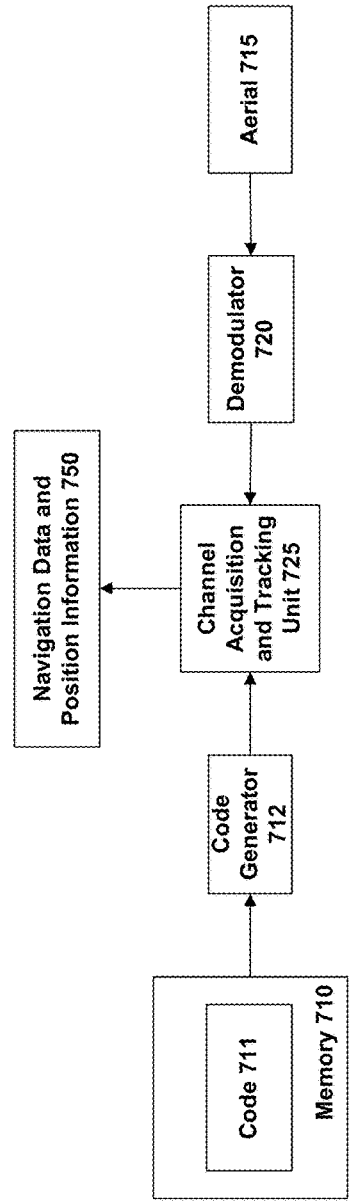
FIG. 10 is a schematic diagram of a receiver for receiving a spreading code in accordance with one embodiment of the invention.

FIG. 10 is a high-level schematic block diagram of a receiver 701 in accordance with one embodiment of the invention. The receiver 701 may be provided as a stand-alone unit, or may be incorporated into some larger device, for example a mobile (cellular) telephone, a computer, an automobile or other form of vehicle, a hospital bed, an aircraft or ship, a freight container, and so on. In operation, receiver 701 includes aerial 715 for receiving a satellite signal such as that transmitted by satellite 601. The aerial 715 links to a de-modulator 720, which in turn passes the incoming de-modulated signal to channel acquisition and tracking unit 725. After the initial acquisition of the signal the tracking unit follows the incoming signal in delay and Doppler and is capable to adjust itself.

The receiver 710 also includes a memory device 710 that stores a code pattern 711 corresponding to $u^{SLCE}$, the generative SLCE sequence for the new code family. As for the satellite system of FIG. 9, memory device 710 may be provided as a read only memory (ROM), or it may have some update capacity, for example, being implemented as a programmable read only memory (PROM) to allow an update of code 711, for example, for commercial or security reasons. Note that in some circumstances memory 710 may represent some form of removable storage medium that can be inserted into and removed from receiver 701. For example, memory device 710 may comprise a smart card (analogous to a SIM in a mobile telephone) or a flash memory device. This might then allow the code 711 in receiver 701 to be updated by replacing the removable memory device. A further possibility is that device 710 may be able to download code 711 from a remote system (e.g. a server) over some communication network, such as the Internet or a mobile telephone connection, for storage in and use from local RAM. This download may be subject to appropriate authorisation of the user, in order to restrict use of the satellite navigation system for commercial, security or legal reasons. In some implementations, the output from memory 710 may be passed through an ECC unit (not shown in FIG. 10) to perform error detection and/or correction as described above in relation to the satellite system 601.

The code 711 is then provided to a code generation unit 725, which generates the relevant PRN code sequences from the generative code 711 according to equation (9) above. In one implementation, the storage of $u^{SLCE}$ 711 is implemented as a circular buffer. Each required code in the new code family, as defined by offset i in equation (9) is generated using two read pointers, one of the read pointers being offset by i chips compared with the other read pointer. The output from each of the two read pointers is then combined using an XOR gate to generate the relevant code. In this manner, the channel acquisition unit 725 can be provided with the relevant spreading code, so that the incoming channel can be acquired from the de-modulated signal.

Note that the channel acquisition unit may perform channel acquisition sequentially, trying one code, then another, and so on. Such a channel acquisition unit can be considered as having a single receive channel. Alternatively, the channel acquisition unit may have multiple receive channels in order to correlate multiple codes (potentially all of them) against the de-modulated signal in parallel. (Most receivers have fewer receive channels than the total number of satellites in the overall constellation of the satellite navigation system, given that only a subset of satellites will be visible at any given time). The code generation unit 712 supplies one or more codes to the channel acquisition unit to support the sequential or parallel operation of the channel acquisition unit as appropriate, i.e. in accordance with the number of receive channels.

The general operation of a receive channel is that the incoming real intermediate frequency signal is converted to a complex baseband signal. The baseband signal is then mixed with the output of a carrier numerically controlled oscillator (NCO) to remove Doppler effects from the signal. Next the incoming signal is correlated with a local spreading code—i.e. a code stored or generated within the receiver and provided by code generation unit 712. The timing of the local code is controlled by the code NCO. The results of this correlation are integrated for a predetermined time, and then passed to a DSP. Here discriminators and loop filters close the respective carrier loop (frequency-locked loop (FLL), phase-locked loop (PLL)) and code loop (delay-locked loop (DLL)) with the relevant NCOs. Once the receiver has locked into an incoming signal by identifying the presence of a particular spreading code, the navigation data can be accessed to identify the other satellites currently visible to the receiver, and therefore to speed the acquisition of the remaining signals. This then allows the receiver to determine a position signal in due course.

Note that because the memory 710 stores only a single generative code, ($u^{SLCE}$), this is a very significant saving in memory compared with a memory code system, such as described in US 2008/0246655, where the full set of all codes used by the various satellites are stored in the receiver memory—e.g. for a typical satellite navigation system providing data and pilot signal channels this sums up to approximately 70 codes, memory 710 is only required to be a few per cent of the capacity of a receiver memory when using a memory code system. Moreover, as with the satellite transmission system 610, memory 710 may be further compacted by using a combinatorial digital logic representation, such as described in WO 2007/101454. Alternatively, memory device 710 may be replaced by circuitry that provides a digital logic representation of the algebraic generation of the code sequence $u^{SLCE}$, analogous to the use of an LFSR for Gold codes. This circuitry then allows the code sequence $u^{SLCE}$ to be (re)generated as and when required.

The new code families disclosed herein have primarily been described in the context of satellite navigation systems (radio satellite navigation systems). The codes can also be used in local elements of such systems, sometimes referred to as pseudolites that might be operating in pulsed or continuous transmission mode. These are local positioning systems, for example at airports, that usually supplement the positioning signals from a satellite navigation system to provide additional location information. Each pseudolite transmits its own PRN sequence, which may be another code from the same code family as the set of PRN sequences used by the various satellites in the satellite navigation system. Thus the use of pseudolites increases the number of potential codes required from a given code family with appropriate correlation properties. Furthermore, the code families disclosed herein can also be applied to general CDMA communications, e.g. as used in many terrestrial applications.

In addition, the new code families disclosed herein have primarily been described in the context of a signal that comprises a single code. However, they may also be used in a hierarchical code, for example, as the primary code and/or secondary code in a hierarchical code that comprises a primary code and a secondary code. Furthermore, the codes may be used in a receiver that is able to receive signals from more than one satellite navigation system, for example, from both Galileo and from GPS.

In conclusion, although a variety of embodiments have been described herein, these are provided by way of example only, and many variations and modifications on such embodiments will be apparent to the skilled person and fall within the scope of the present invention, which is defined by the appended claims and their equivalents.

The invention claimed is:

1. A receiver for use in a navigation system comprising multiple transmitters, each transmitter transmitting a positioning signal comprising a pseudo-random noise (PRN) sequence corresponding to the respective transmitter, the receiver comprising:

a code module for supplying multiple PRN sequences corresponding to the respective multiple transmitters, wherein the code module includes memory for storing the multiple PRN sequences or digital logic circuitry for generating the multiple PRN sequences on the fly, wherein said multiple PRN sequences are based on a single Sidelnikov/Lempel/Cohn/Eastman (SLCE) generative sequence $u^{SLCE}$ that provides a family of N/2 PRN sequences where N is the length of each PRN sequence in the family, each of said PRN sequences in the family, denoted $u^i$, satisfying the equation: $u^i = u^{SLCE} \oplus T^i u^{SLCE}$, where $\oplus$ indicates element by element binary XOR addition, and $T^i$ indicates a cyclic shift of i chips; and a correlator for correlating the multiple PRN sequences supplied by the code module with an incoming signal to detect positioning signals from respective transmitters, wherein the multiple pseudo-random noise (PRN) sequences supplied by the code module comprise a subset of the N/2 pseudo-random noise (PRN) sequences in the family, said subset being selected by an optimization procedure to provide good correlation properties for odd correlation, wherein odd correlation represents a change in polarity of the PRN sequence being correlated.

2. The receiver of claim 1, wherein multiple PRN sequences have an even length, equal to a prime number minus 1.

3. The receiver of claim 1 or 2, wherein none of the multiple PRN sequences has a balance greater than four.

4. The receiver of claim 3, wherein all the multiple PRN sequences have a balance of zero.

5. The receiver of claim 1, wherein $u^{SLCE}$ is derived from a primitive root element of a prime number p, and the maximum correlation magnitude for said multiple PRN sequences is given by $4+2\lceil\sqrt{N}\rceil$, where N=p−1.

6. The receiver claim 1, wherein $u_{SLCE}$ is derived from a primitive root element of a prime number p, and the maximum correlation magnitude for said multiple PRN sequences is given by $12+2\lceil\sqrt{N}\rceil$, where N=p−1.

7. A method of operating a receiver for use in a navigation system comprising multiple transmitters, each transmitter transmitting a positioning signal comprising a pseudo-random noise (PRN) sequence corresponding to the respective transmitter, the method comprising:

receiving an incoming signal at the receiver;

supplying, form a code module, multiple PRN sequences corresponding to the positioning signals of the respective multiple transmitters, wherein the code modules includes memory for storing the multiple PRN sequences or digital logic circuitry for generating the multiple PRN sequences on the fly, wherein said multiple PRN sequences are based on a single Sidelnikov/Lempel/Cohn/Eastman (SLCE) generative sequence $u^{SLCE}$ that provides a family of N/2 PRN sequences, where N is the length of each PRN sequence in the family, each of said PRN sequences in the family, denoted $u^i$, satisfying the equation: $u^i = u^{SLCE} \oplus T^i u^{SLCE}$, where $\oplus$ indicates element by element binary XOR addition, and $T^i$ indicates a cyclic shift of i chips; and correlating the incoming signal against multiple PRN sequences supplied by the code module with the incoming signal to detect positioning signals from respective transmitters;

wherein the multiple pseudo-random noise (PRN) sequences comprise a subset of the N/2 pseudo-random noise(PRN) sequences selected by an optimization procedure to provide good correlation properties for odd correlation, wherein off correlation represents a change in polarity of the PRN sequence being correlated.

8. A navigation system comprising multiple transmitters, each transmitter transmitting a positioning signal comprising a pseudo-random noise (PRN) sequence corresponding to the respective transmitter, each transmitter comprising:
a code module for supplying a PRN sequence corresponding to the positioning signal of said transmitter, wherein the code module includes memory for storing the PRN sequence or digital logic circuitry for generating the PRN sequence on the fly,
wherein said PRN sequence for each respective transmitter is generated according to: $u^i = u^{SLCE} \oplus T^i u^{SLCE}$, where $u^{SLCE}$ is a single Sidelnikov/Lempel/Cohn/Eastman (SLCE) generative sequence, $\oplus$ indicates element by element binary XOR addition, and $T^i$ indicates a cyclic shift of i chips, and different transmitters have a different respective PRN sequence by selecting a different value of i, and wherein the generative sequence provides a family of N/2 pseudo-random noise (PRN) sequences, where N is the length of each PRN sequence in the family; and
a transmitter module for transmitting the PRN sequence supplied by the code module,
wherein the pseudo-random noise (PRN) sequences corresponding to the multiple transmitters comprise a subset of the N/2 pseudo-random noise (PRN) sequences selected by an optimization procedure to provide good correlation properties for odd correlation, wherein odd correlation represents a change in polarity of the PRN sequence being correlated.

9. The navigation system of claim 8, wherein at least one of the transmitters comprises a satellite.

10. The navigation system of claim 8, wherein at least one of the transmitters comprises a pseudolite.

11. A method of operating a navigation system comprising multiple transmitters, each transmitter transmitting a positioning signal comprising a pseudo-random noise (PRN) sequence corresponding to the respective transmitter, the method comprising each transmitter:
supplying a PRN sequence from a code module to a transmitter module in said transmitter, the PRN sequence corresponding to the positioning signal of said transmitter, wherein the code module includes memory for storing the PRN sequence or digital logic circuitry for generating the PRN sequence on the fly,
wherein said PRN sequence for each respective transmitter is generated according to: $u^i = u^{SLCE} \oplus T^i u^{SLCE}$, where $u^{SLCE}$ is a single Sidelnikov/Lempel/Cohn/Eastman (SLCE) generative sequence, $\oplus$ indicates element by element binary XOR addition, and $T^i$ indicates a cyclic shift of i chips, and different transmitters have a different respective PRN sequence by selecting a different value of i, and wherein the generative sequence provides a family of N/2 pseudo-random noise (PRN) sequences, where N is the length of each PRN sequence in the family; and
transmitting the PRN sequence supplied by the code module from the transmitter module;

wherein the multiple pseudo-random noise (PRN) sequences comprise a subset of the N/2 pseudo-random noise (PRN) sequences selected by an optimization procedure to provide good correlation properties for odd correlation, wherein odd correlation represents a change in polarity of the PRN sequence being correlated.

12. A method of generating a set of pseudo-random noise (PRN) sequences for use in a navigation system comprising multiple transmitters, each transmitter transmitting a positioning signal corresponding to the respective transmitter, wherein each positioning signal comprises one of the set of pseudo-random noise (PRN) sequences, the method comprising:
providing a Sidelnikov/Lempel/Cohn/Eastman (SLCE) generative sequence, $u^{SLCE}$;
generating each PRN sequence in said set of PRN sequences according to: $u^i = u^{SLCE} \oplus T^i u^{SLCE}$, where $\oplus$ indicates element by element binary XOR addition, and $T^i$ indicates a cyclic shift of i chips, wherein the generative sequence provides a family of N/2 pseudo-random noise (PRN) sequences, where N is the length of each pseudo-random noise (PRN) sequence in the family;
and selecting the set of multiple pseudo-random noise (PRN) sequences as a subset of the family of N/2 pseudo-random noise (PRN) sequences using an optimization procedure to provide good correlation properties for odd correlation, wherein odd correlation represents a change in polarity of the PRN sequence being correlated.

13. The method of claim 12, further comprising selecting the set of PRN sequences such that each PRN sequence has a balance of zero.

14. A communication system comprising multiple transmitters and receivers, in which multiple transmissions are performed in parallel from the transmitters to the receivers, each of said multiple transmissions being encoded using a spreading code comprising one of a set of pseudo-random noise (PRN) sequences, wherein each PRN sequence in said set of PRN sequences is particular to a respective transmitter and is specified by: $u^i = u^{SLCE} \oplus T^i u^{SLCE}$, where $u^{SLCE}$ denotes a Sidelnikov/Lempel/Cohn/Eastman (SLCE) generative sequence, $\oplus$ indicates element by element binary XOR addition, and $T^i$ indicates a cyclic shift of i chips, wherein the generative sequence provides a family of N/2 pseudo-random noise (PRN) sequences, where N is the length of each pseudo-random noise (PRN) sequence in the family;
wherein the set of multiple pseudo-random noise (PRN) sequences comprise a subset of the N/2 pseudo-random noise (PRN) sequences in the family, the subset being selected by an optimization procedure to provide good correlation properties for odd correlation, wherein odd correlation represents a change in polarity of the PRN sequence being correlated;
and wherein each receiver stores or generates using digital logic circuitry each of the PRN sequences in said set of PRN sequences for identifying transmissions from each respective transmitter.

* * * * *

UNITED STATES PATENT AND TRADEMARK OFFICE
CERTIFICATE OF CORRECTION

| | |
|---|---|
| PATENT NO. | : 10,088,573 B2 |
| APPLICATION NO. | : 14/238813 |
| DATED | : October 2, 2018 |
| INVENTOR(S) | : Wallner |

It is certified that error appears in the above-identified patent and that said Letters Patent is hereby corrected as shown below:

In Column 20 (Line 47), please delete the word "form" and replace with the word --from--.

Signed and Sealed this
Fourth Day of December, 2018

Andrei Iancu
*Director of the United States Patent and Trademark Office*